(12) United States Patent
Yamaguchi

(10) Patent No.: US 8,850,462 B2
(45) Date of Patent: Sep. 30, 2014

(54) DISK DRIVE APPARATUS WITH A CENTERING MECHANISM

(75) Inventor: Tsuyoshi Yamaguchi, Ueda (JP)

(73) Assignee: Nidec Corporation, Kyoto (JP)

( * ) Notice: Subject to any disclaimer, the term of this patent is extended or adjusted under 35 U.S.C. 154(b) by 297 days.

(21) Appl. No.: 12/625,626

(22) Filed: Nov. 25, 2009

(65) Prior Publication Data

US 2010/0077419 A1  Mar. 25, 2010

(30) Foreign Application Priority Data

Jan. 12, 2008 (JP) .................................. 2008-306013

(51) Int. Cl.
*G11B 17/028*   (2006.01)

(52) U.S. Cl.
CPC .................................. *G11B 17/0282* (2013.01)
USPC .......................................... 720/704; 720/710

(58) Field of Classification Search
CPC .... G11B 17/02; G11B 17/022; G11B 17/028; G11B 17/0282
USPC ................................................. 720/703–714
See application file for complete search history.

(56) References Cited

U.S. PATENT DOCUMENTS 4,791,624 A * 12/1988 Stinesen ....................... 720/704
6,952,834 B2 * 10/2005 Inatani et al. ................. 720/696

2003/0026193 A1 * 2/2003 Shiomi et al. ................ 369/270
2007/0028255 A1   2/2007 Ito
2007/0277189 A1 * 11/2007 Yasumoto et al. ............ 720/710

FOREIGN PATENT DOCUMENTS

| JP | 62-043860 A |   | 2/1987 |
| JP | 62-43860 A |   | 2/1987 |
| JP | 05334779 A | * | 12/1993 |
| JP | 9-297960 A |   | 11/1997 |
| JP | 2002260313 A | * | 9/2002 |
| JP | 2007-59040 A1 |   | 3/2007 |

OTHER PUBLICATIONS

Machine-Assisted Translation of JP 2002260313 A.*
English translation of JP 05334779 A.*
Japanese Office Action issued Jul. 2, 2012, issued in corresponding Japanese Application No. 2008-306013.

* cited by examiner

*Primary Examiner* — Nathan Danielsen
(74) *Attorney, Agent, or Firm* — Westerman, Hattori, Daniels & Adrian, LLP

(57) ABSTRACT

A disk drive apparatus able to prevent jamming of a disk and abutting parts having a rotary table fit on a shaft of a brushless motor and carrying a disk and a centering part elastically biased in an axial direction away from a center hole of this rotary table and fit in a center through hole of the disk to center and hold the disk, the centering part having inelastic abutting parts sticking out from a center taper part in radial directions and abutting against an inner circumferential edge of the center through hole and having outer circumferential groove parts forming clearances from the inner circumferential edge between the inelastic abutting parts adjoining each other in the circumferential direction.

7 Claims, 4 Drawing Sheets

DISK DRIVE APPARATUS WITH A CENTERING MECHANISM

CROSS-REFERENCE TO RELATED APPLICATION

This application is based upon and claims the benefit of priority of the prior Japanese Patent Application No. 2008-306013, filed on Dec. 1, 2008, the entire contents of which are incorporated herein by reference.

BACKGROUND OF THE INVENTION

1. Field of the Invention

The present invention relates to a disk drive apparatus for a high density DVD etc., more particularly relates to a centering mechanism fit into a center through hole of a disk to center and hold the disk.

2. Description of the Related Art

The disk drive apparatus disclosed in Japanese Patent Publication (A) No. 2007-59040 (FIG. 2) has a rotary table fit on a motor shaft and carrying a disk, and has a centering part elastically biased in an axial direction away from the insides of a center hole of this rotary table and fit into a center through hole of the disk to center and hold the disk. The centering part has elastic abutting parts abutting against the inner circumferential edge of the center through hole and has a surface roughness Ry of the abutting surfaces of the elastic abutting parts in the range of about 5 $\mu m \leq Ry \leq$ about 20 $\mu m$.

The reason why the abutting surfaces are given such a surface roughness Ry is that a jamming phenomenon where the elastic abutting parts are pushed unilaterally by the centrifugal force directed in one direction due to imbalance of the disk occurring during high speed rotation, the abutting force of the disk and elastic abutting parts becomes stronger, and the disk and the elastic abutting parts end up jamming can be prevented by the lower frictional coefficient when the elastic abutting parts move in the axial direction and therefore recording and reproduction error can be eliminated.

The surface roughness Ry is obtained by setting the surface roughness of the mold used when forming the centering part from plastic, but due to the environment of use of the disk drive apparatus and the years of use, dirt and oil will deposit on the abutting surfaces and wear will occur. The frictional coefficient of the abutting surfaces does not depend only the surface roughness Ry, so the reliability of prevention of the jamming phenomenon is low.

Further, as a practical problem, at the time of molding the plastic, the precision of molding thickness is usually 0.1 mm (100 $\mu m$) or so, therefore trying to obtain the above level of surface roughness in products would lead to a drop in yield.

SUMMARY OF THE INVENTION

Therefore, in view of the above problem, an object of the present invention is to provide a disk drive apparatus enabling the prevention of jamming of the disk and abutting parts without the need for setting the surface roughness of the abutting surfaces in a predetermined range.

The present invention provides a disk drive apparatus having a rotary table fit on a motor shaft and carrying a disk and having a centering part elastically biased in an axial direction away from a center hole of this rotary table and fit in a center through hole of the disk to center and hold the disk. The centering part has inelastic abutting parts sticking out from a center taper part in radial directions and abutting against an inner circumferential edge of the center through hole and has outer circumferential groove parts forming clearances from the inner circumferential edge between the inelastic abutting parts adjoining each other in the circumferential direction.

The abutting parts abutting against the inner circumferential edge of the center through hole are inelastic. Further, the outer circumferential groove parts are formed between the inelastic abutting parts adjoining in the circumferential direction, so in the state with the inelastic abutting parts abutting against the inner circumferential edge of the center through hole and the disk thus centered and held, arc-shaped clearances can be secured from the inner circumferential edge of the center through hole. There is freedom of movement of the inelastic abutting parts in the axial direction, so at the time of high speed rotation of the disk, the jamming phenomenon of the disk and abutting parts can be prevented and recording and reproduction error can be eliminated.

As a substantive depth of each of the outer circumferential groove parts, 0.1 mm is sufficient. Further, an arc length of each of the outer circumferential groove parts is preferably longer than a width of an inelastic abutting part in the circumferential direction.

According to the present invention, it is possible to prevent the jamming phenomenon between the disk and abutting parts and possible to eliminate recording and reproduction error.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENT

Figure 1:
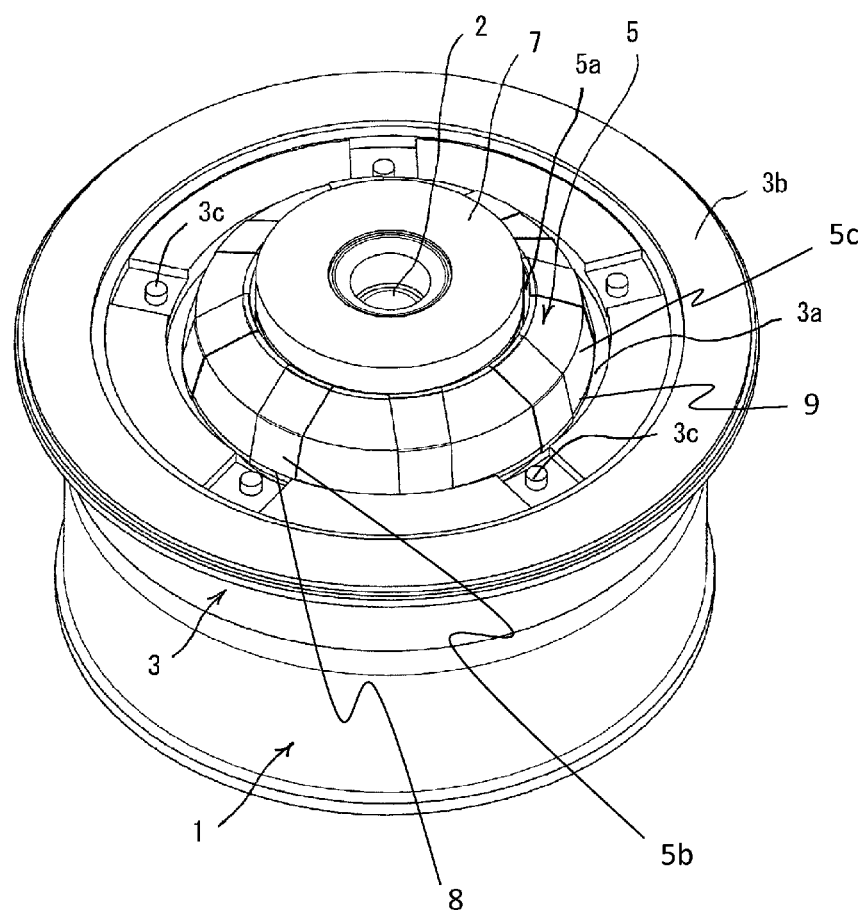
FIG. 1 is a perspective view showing a disk drive apparatus according to an embodiment of the present invention.
Figure 2:
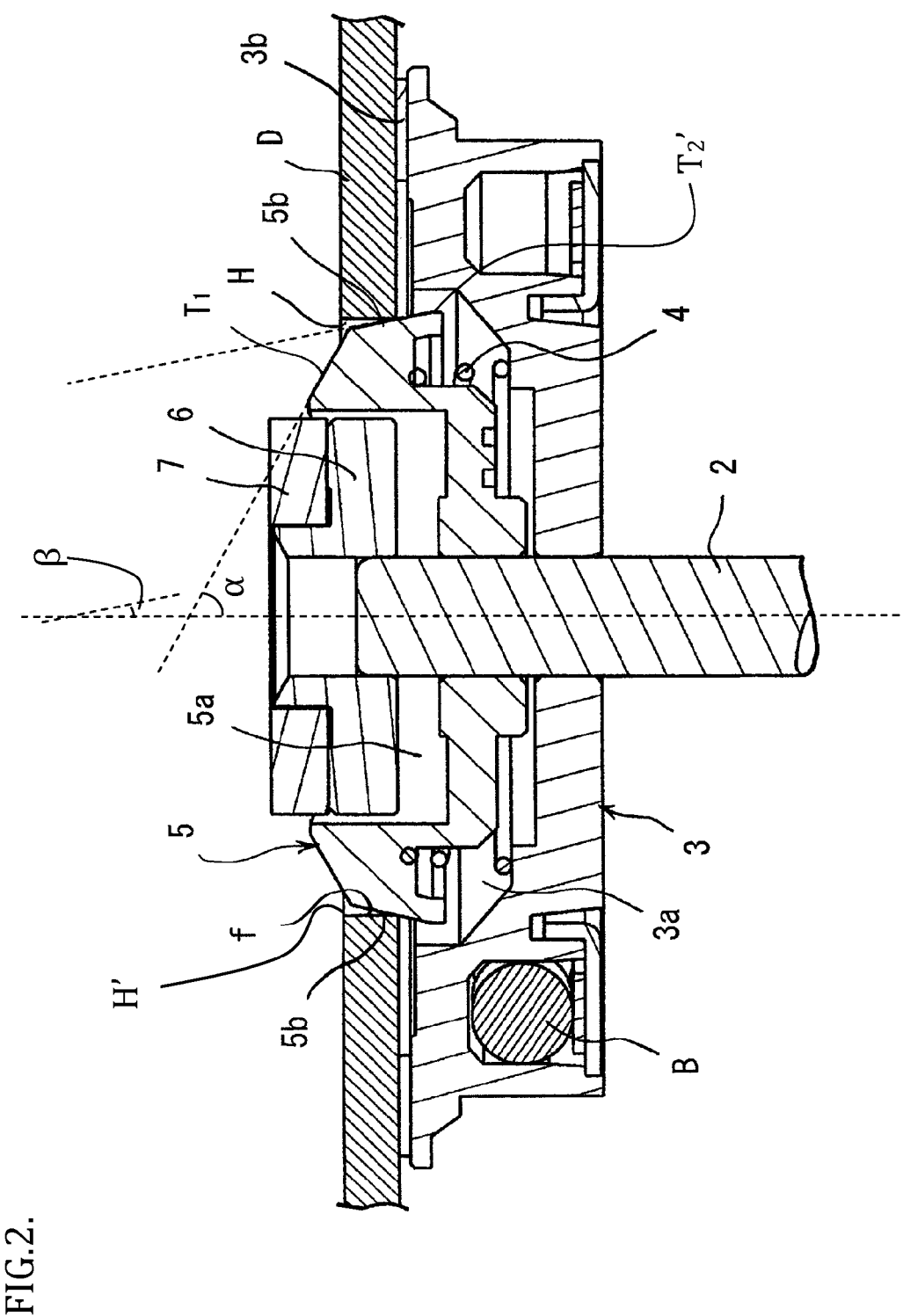
FIG. 2 is a vertical cross-sectional view showing a rotary table side of the same disk drive apparatus.
Figure 3:
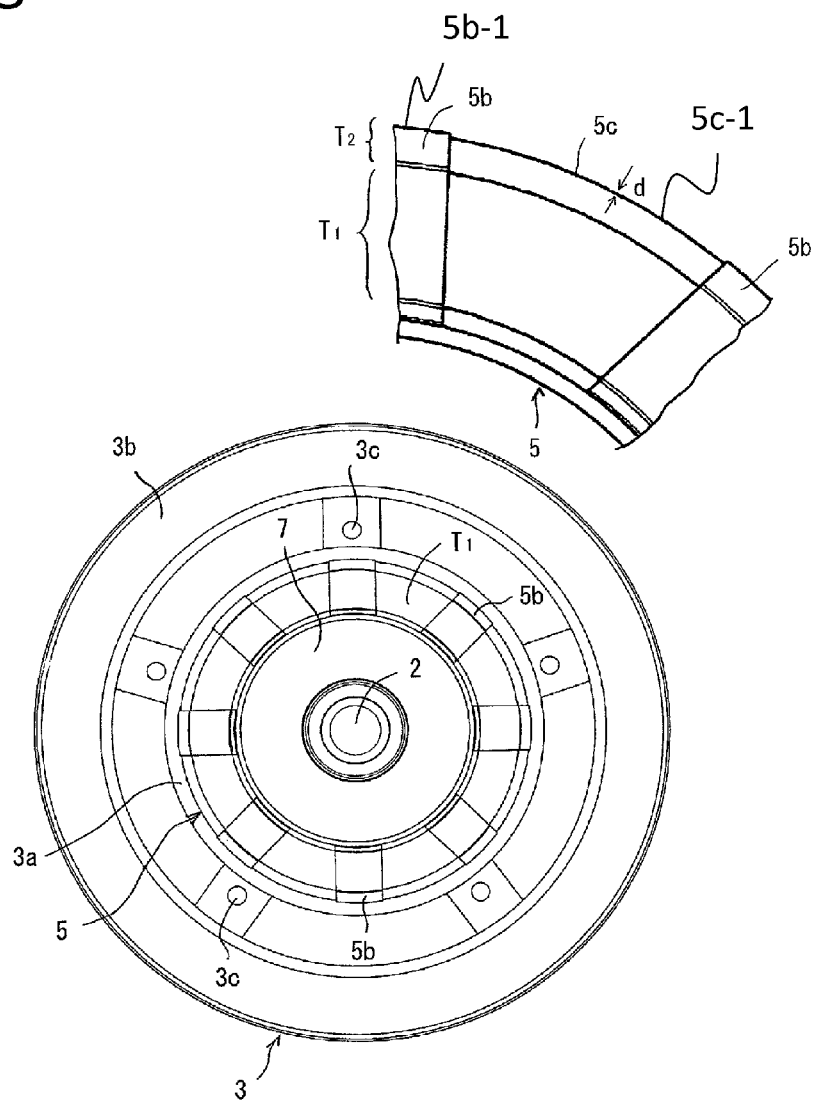
FIG. 3 is a plan view showing the same rotary table side and a partial view enlarging part of the same.

Next, the present invention will be explained based on a preferred embodiment. FIG. 1 is a perspective view showing a disk drive apparatus according to an embodiment of the present invention; FIG. 2 is a vertical cross-sectional view showing a rotary table side of the same disk drive apparatus; and FIG. 3 is a plan view showing the same rotary table side and a partial view enlarging part of the same.

The disk drive apparatus of the present embodiment is provided with a brushless motor 1, a plastic rotary table 3 fit over a shaft 2 of the same and carrying a disk D, a plastic centering part 5 elastically biased by a coil spring 4 in an axial direction away from the inside of a center hole 3a of this rotary table 3 and fit in a center through hole H of the disk D to center and hold the disk D, a back yoke fit over a front end of the shaft 2 in a center hole 5a of this centering part 5, and a cylindrical chucking magnet 7 provided on top of this back yoke 6 and attracting a cover side disk holder (not shown).

Note that, B indicates a ball balancer rolling inside a ring-shaped path in the rotary table 3, 3b an antislip rubber ring, and 3c a projecting burr remaining corresponding to a plastic injection port at the time of forming the rotary table 3.

The centering part 5 is comprised of a center slow taper part $T_1$ and a fast taper part $T_2$ formed integrally with the outer circumference side. The fast taper part $T_2$ has inelastic abutting parts 5*b* sticking out in the radial direction every 45° and abutting against the inner circumferential edge f of the center through hole H. Between the outer circumferential surface of the fast taper part $T_2$ and each pair of adjoining inelastic abutting parts 5*b*, 5*b*, an outer circumferential groove part 5*c* is provided for forming a clearance from the inner circumferential edge f of the center through hole H. The taper surface forming the bottom of the groove of each of the outer circumferential groove parts 5*c* is formed so as to be parallel to the taper surface of the abutting surface of each of the inelastic abutting parts 5*b*. Further, at the substantive depth d=0.1 mm of each of the outer circumferential groove parts 5*c*, the arc length of each of the outer circumferential groove parts 5*c* is longer than the width of each of the inelastic abutting parts 5*b* in the circumferential direction.

In this embodiment, the abutting parts 5*b* abutting against the inner circumferential edge f of the center through hole H are inelastic. Further, the outer circumferential groove parts 5*c* are formed between the inelastic abutting parts 5*b*, 5*b* adjoining each other in the circumferential direction. Therefore, in the state with the inelastic abutting parts 5*b* abutting against the inner circumferential edge f of the center through hole H and the disk D being centered and held, arc-shaped clearances can be secured with the inner circumferential edge f of the center through hole H. There is freedom of movement of the inelastic abutting parts 5*b* in the axial direction, so at the time of high speed rotation of the disk, the jamming phenomenon of the disk D and abutting parts 5*b* can be prevented and recording and reproduction error can be eliminated.

As illustrated in FIG. 2, the disk drive apparatus carries a disk D having a center through hole H with an inner circumferential edge H'. The fast taper part $T_2$ has an angle β smaller than that the angle α of the center slow taper part $T_1$ with respect to the motor shaft 2. The centering part 5 includes outer circumferential groove parts 5*c*. As illustrated in FIG. 2, an outer edge $T_2$' of each of the fast taper parts $T_2$ is radially outside the inner circumferential edge H' of the disk D, as illustrated in FIG. 2.

Figure 4:
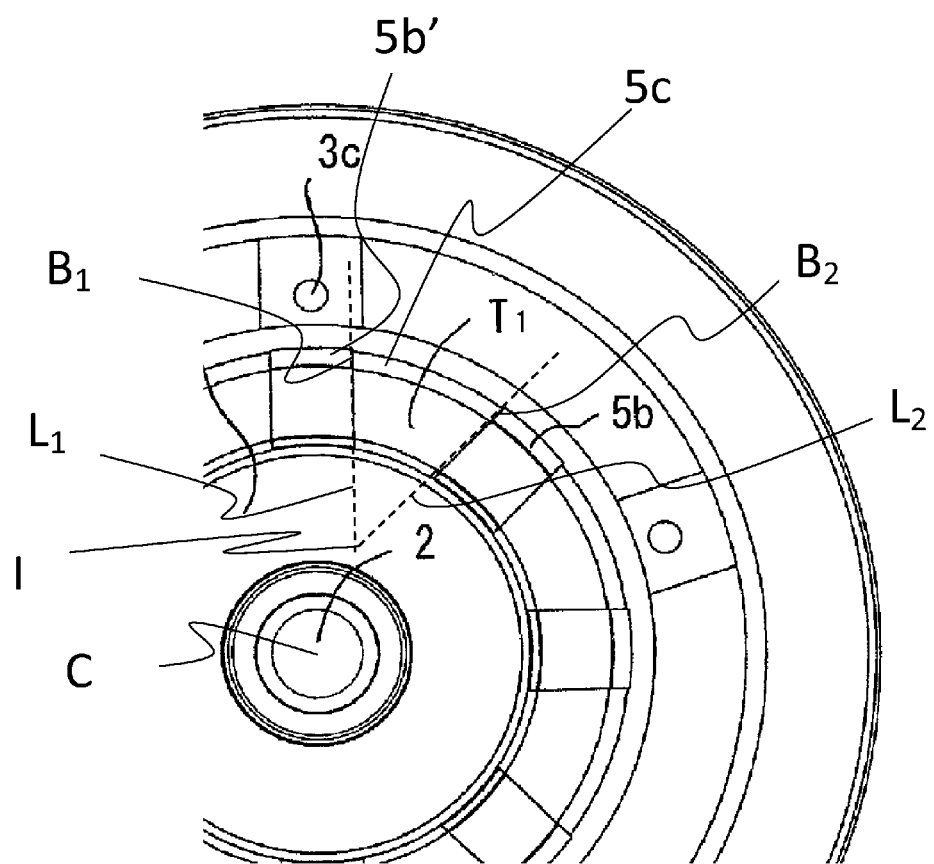
FIG. 4 is a partial enlargement view of FIG. 3.

FIG. 4 is a partial enlargement view of FIG. 3. As illustrated in FIG. 4, the motor shaft 2 has a rotation center C. The centering part 5 includes a center taper part (i.e., slow taper part $T_1$). The centering part also includes outer taper parts 5*b*, 5*b*' and outer circumferential groove parts 5*c*. A first straight line $L_1$ can be drawn at the first boundary $B_1$ between the outer taper part 5*b*' and the outer circumferential groove part 5*c*. A second straight line $L_2$ can be drawn at the second boundary $B_2$ between another one of the taper parts 5*b* and the outer circumferential groove part 5*c*. The first straight line $L_1$ and the second straight line $L_2$ cross to form an intersection I. As illustrated in FIG. 4, the intersection I is located radially inside the first boundary $B_1$ or the second boundary $B_2$, and radially outside the rotation center C.

As shown in FIG. 1, the centering part 5 further includes a peripheral part 8 lower than the outer taper parts 5*b*. As shown in FIG. 1, the peripheral part 8 has a different angle than the outer taper parts with respect to the motor shaft 2. As shown in FIG. 1, the centering part 5 further includes another peripheral part 9 lower than the outer circumferential groove parts 5*c*. As shown in FIG. 1, the peripheral part 9 has a different angle than the outer circumferential groove parts 5*c* with respect to the motor shaft 2.

As shown in FIG. 3, a circumferential length at the lower edge 5*c*-1 of each of said outer circumferential groove parts 5*c* is longer than a circumferential length at the lower edge 5*b*-1 of each of said outer taper parts 5*b*.

While the invention has been described with reference to specific embodiments chosen for purpose of illustration, it should be apparent that numerous modifications could be made thereto by those skilled in the art without departing from the basic concept and scope of the invention.

The invention claimed is:

1. A disk drive apparatus to carry a disk having a center through hole with an inner circumferential edge, the disk drive apparatus comprising:
    a motor shaft having a rotation center thereof,
    a rotary table fit on the motor shaft, and
    a centering part slidably provided on the motor shaft, wherein the centering part is elastically biased in an axial direction away from the rotary table, wherein the centering part fits in the center through hole of the disk to center and hold the disk,
    the centering part comprising:
        a center taper part;
        outer taper parts; and
        outer circumferential groove parts, wherein when a first straight line is drawn at a first boundary between one of the outer taper parts and one of the outer circumferential groove parts; and when a second straight line is drawn at a second boundary between another one of the taper parts and said one of the outer circumferential groove parts, the first straight line and the second straight line form an intersection, in which, in a plan view, the intersection is located radially inside the first boundary or the second boundary, and radially outside the rotation center,
    wherein each of the outer taper parts has an angle smaller than that of the center taper part with respect to the motor shaft,
    wherein the outer taper parts and the outer circumferential groove parts are alternately provided radially outside the center taper part,
    wherein each of the outer taper parts abuts the inner circumferential edge of the center through hole while each of the outer circumferential groove parts provides a clearance between the inner circumferential edge and said each of the outer circumferential groove parts.

2. The disk drive apparatus as set forth in claim 1, wherein a substantive depth of each of said outer circumferential groove parts is 0.1 mm.

3. The disk drive apparatus as set forth in claim 1, wherein a circumferential length at the lower edge of each of said outer circumferential groove parts is longer than a circumferential length at the lower edge of each of said outer taper parts.

4. The disk drive apparatus as set forth in claim 1, further comprising a spring between the rotary table and the centering part.

5. The disk drive apparatus as set forth in claim 1, wherein an outer edge of each of the outer taper parts is radially outside the inner circumferential edge of the disk.

6. The disk drive apparatus as set forth in claim 1, the centering part further comprising a first peripheral part lower than the outer taper parts, the first peripheral part has a different angle than the outer taper parts with respect to the motor shaft.

7. The disk drive apparatus as set forth in claim 1, the centering part further comprising a second peripheral part lower than the outer circumferential groove parts, the second peripheral part has a different angle than the outer circumferential groove parts with respect to the motor shaft.

* * * * *